No Printed Specification Available
8737X
T. Gilpin,
Hay Press,
Patented Apr. 3, 1835.
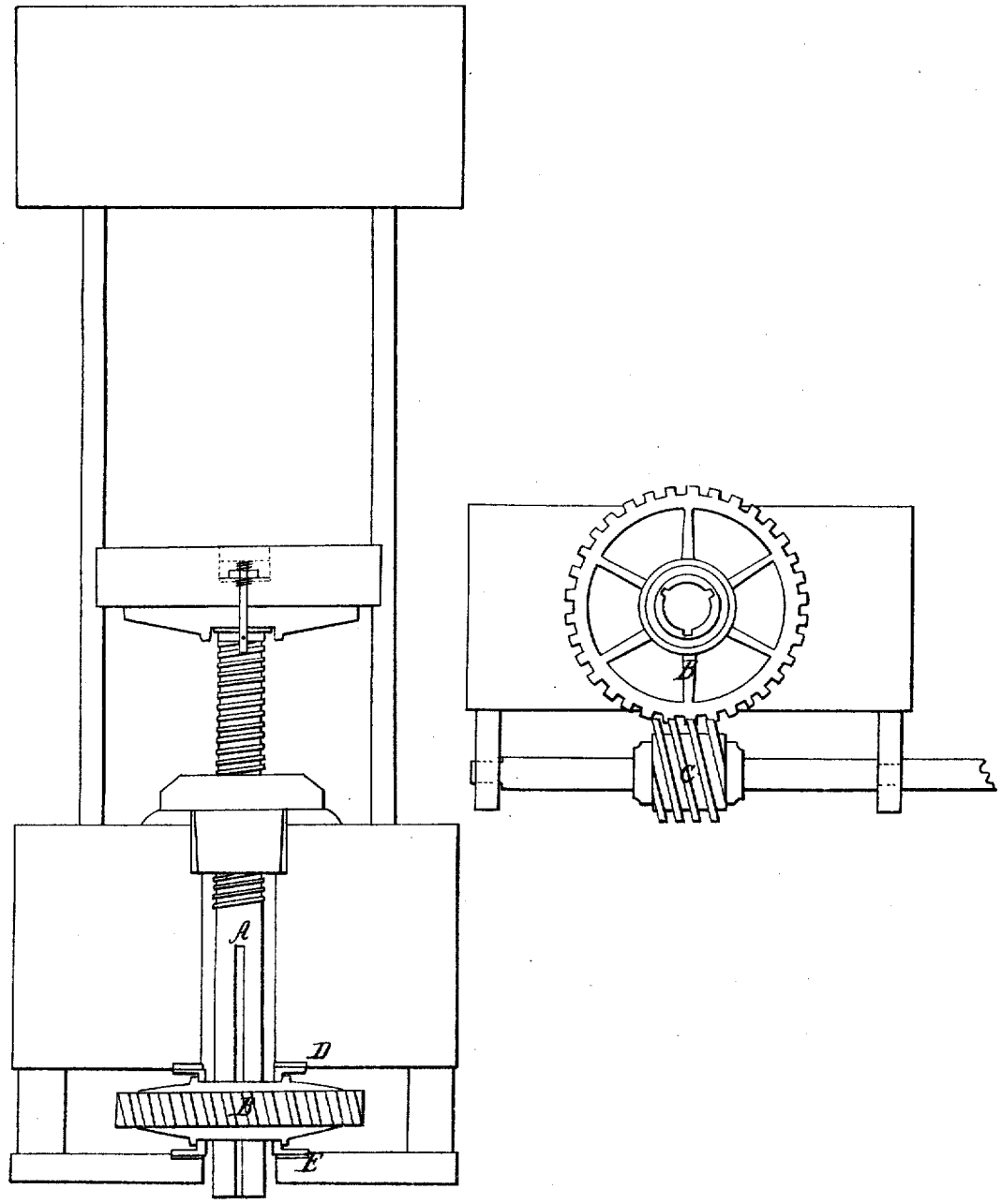
AM. PHOTO-LIT'HG. CO. N.Y. (OSBORNE'S PROCESS)

Apl. 3. 1835 387

Thomas Gilpin 8737X
Letters Patent

The Schedule referred to in these Letters Patent and making part of the same containing a description in the words of the said Thomas Gilpin himself of his improvement in the construction of screw Presses and in the movement of screws by machinery To all to whom these presents shall come. Be it known that I Thomas Gilpin of the County of New Castle and State of Delaware have invented a new and useful improvement in constructing a screw press: so as to move screws in presses by means of machinery and to obtain with them a pressure by water power or other power with less friction and to more advantage than has been done heretofore. and that the following is a full and exact description of the construction and operation of the said machine or improvement as invented constructed & improved by me viz. Because a screw pin as far as it relates to the part containing the screw and also the box thro which it turns to be constructed in the usual way and well known manner. But that part of the screw pin, where it is usually adapted to be formed for the head of the screw and to which is to be attached apparatus or to receive a lever or beam to give power or purchase I continue straight and is a considerable length either round, square, or of some other regular form so that it may pass thro' and be fitted thro' the centre or eye of a wheel in such manner as that the wheel may pass easily backwards and forwards upon it. This part of the screw pin must remain uncut by the thread of the screw, and must be at least as long as the thickness of the wheel added to the length of that part of the screw pin on which the thread of the screw is cut. If the uncut part of the screw pin is round it would be better for it to be turned smooth and the eye of the wheel to be bored out true to fit it. It must be furnished with one or or more feathers to fit into grooves cut into the eye of the wheel and which must correspond nicely to each other. so that whenever the wheel may be turned round by the application of machinery) the screw pin shall be turned round also. altho' the screw pin will be carried lengthwise thro' the eye of the wheel backwards or forwards according as the thread of the screw may be drawn or moved as it is turned thro' the box of the screw – in which the threads of both the box and screw pin are adapted to each other. I fix the said wheel which turns the screw pin firmly between two surfaces to confine it in a fixed position as it regards its place horizontally or vertically in relation to the machinery) which is to move it around and to prevent it from being moved or drawn by any friction or attachment it might have upon the screw pin. Thus this driving wheel being held in this position and turned, the screw pin is urged round by the feathers or projections upon it, and it is drawn thro' the eye of the wheel as it turns in the screw box in conformity to the threads in the same. I have heretofore used a worm wheel upon the screw pin to be moved by a worm on a shaft, because this answers well to give a slow and powerful motion, but any other wheels as spur wheels &c may be applied to answer equally well according as speed or power is required. The drawing and references signed by me are hereunto annexed and exhibited the said machine. Wilmington. New Castle County. Delaware 17th Feby 1835.

Witness
Allen Mills
Jacob Bennett

Thomas Gilpin (Patented 3 April 1835)

Exd.
[illegible]

(Drawing)